(12) United States Patent
Holtmanns et al.

(10) Patent No.: US 10,555,163 B2
(45) Date of Patent: Feb. 4, 2020

(54) HANDLING OF CERTIFICATES FOR EMBEDDED UNIVERSAL INTEGRATED CIRCUIT CARDS

(71) Applicant: NOKIA SOLUTIONS AND NETWORKS OY, Espoo (FI)

(72) Inventors: Silke Holtmanns, Klaukkala (FI); Martin Karl Peylo, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/546,702

(22) PCT Filed: Jan. 27, 2015

(86) PCT No.: PCT/EP2015/051561
§ 371 (c)(1),
(2) Date: Jul. 27, 2017

(87) PCT Pub. No.: WO2016/119821
PCT Pub. Date: Aug. 4, 2016

(65) Prior Publication Data
US 2018/0027405 A1   Jan. 25, 2018

(51) Int. Cl.
*H04W 8/18* (2009.01)
*H04W 4/70* (2018.01)
(Continued)

(52) U.S. Cl.
CPC .......... *H04W 8/183* (2013.01); *H04B 1/3816* (2013.01); *H04L 63/068* (2013.01); *H04W 4/70* (2018.02); *H04L 63/0823* (2013.01)

(58) Field of Classification Search
CPC .................................................. H04L 63/0823
See application file for complete search history.

(56) References Cited

U.S. PATENT DOCUMENTS

| 8,812,837 B2 | 8/2014 | McCanna et al. |
| 2010/0062808 A1 | 3/2010 | Cha et al. |

(Continued)

FOREIGN PATENT DOCUMENTS

| CN | 103329582 A | 9/2013 |
| WO | 2013/036010 A1 | 3/2013 |

OTHER PUBLICATIONS

U.S. Appl. No. 62/078,006, filed Nov. 2014, Wane; Ismaila.*

(Continued)

*Primary Examiner* — Hsinchun Liao
(74) *Attorney, Agent, or Firm* — Squire Patton Boggs (US) LLP

(57) ABSTRACT

The present invention provides apparatuses, methods, computer programs, computer program products and computer-readable media regarding handling of certificates for embedded Universal Integrated Circuit Cards. The present invention comprises composing, by a management entity, such as a subscription manager, a deletion command message for deleting certificates from an embedded universal integrated circuit card, eUICC, on which a plurality of certificates is pre-installed, the deletion command message including information on certificates to be deleted and an authorization of the management entity, and transmitting the deletion command message to the eUICC.

10 Claims, 3 Drawing Sheets

(51) Int. Cl.
   *H04B 1/3816*   (2015.01)
   *H04L 29/06*   (2006.01)

(56) References Cited

U.S. PATENT DOCUMENTS

2011/0263225 A1    10/2011   Escott et al.
2013/0227646 A1*    8/2013   Haggerty ............ H04L 63/0853
                                                              726/3

OTHER PUBLICATIONS

International Search Report and Written Opinion corresponding to International Patent Appln. No. PCT/EP2015/051561, dated Oct. 13, 2015.
GSM Association GSMA—Remote Provisioning Architecture for Embedded UICC Technical Specification Version 1.0; 2013; Architecture for Embedded UICC Technical Specification Remote Provisioning; Dec. 17, 2013; the whole document.
COMPUTERWEEKLY The EU data protection reforms and cloud storage; 2014.
Ziegler Russia passes law requiring online personal data to be stored inside its borders; 2014.

* cited by examiner

HANDLING OF CERTIFICATES FOR EMBEDDED UNIVERSAL INTEGRATED CIRCUIT CARDS

FIELD OF THE INVENTION

The present invention relates to apparatuses, methods, systems, computer programs, computer program products and computer-readable media regarding handling of certificates for embedded Universal Integrated Circuit Cards (UICCs).

The present invention further relates to the field of embedded UICCs, machine-to-machine (M2M) communication, certificate revocation, remote secure element management, public key infrastructure (PKI) and certificate updating in secure elements, and support for regional Certificate Authorities for embedded UICCs, global production chains and local legislations.

BACKGROUND OF THE INVENTION

Today and in future, many consumer devices are and will be equipped with an embedded Universal Integrated Circuit Card (eUICC) at manufacturing time. The eUICC is a secure element which can be remotely managed. An eUICC might be physically embedded onto a computer board, but it can also be implemented on a removable form factor. Some examples where eUICCs are installed comprise cars, smart watches, e-book readers etc.

Those items are most often produced on "global level" which means that the same hardware variant of an item is sold in a various number of countries. Typical examples of such are certain e-book readers with integrated mobile connection capabilities. Of course, manufacturers of consumer products do not want to be forced to do country specific hardware variants which would increase manufacturing costs.

This implies that the eUICC should work globally for remote subscription provisioning. Currently, only one root certificate, which is a self-signed certificate of the certificate issuer (CI) used to authenticate certificates issued to other entities, is put into the eUICC (cf. GSMA (GSM (Global System for Mobile communication) Association) eUICC provisioning specifications as defined in document [1]).

Generally, this would be technically enough. However, the root certificate in the eUICC allows remote installation of any kind of software. Thus, also any sort of tracking and spying software can be remotely installed using the root certificate.

Therefore, many countries would like to keep the full control of their machines and data in their hands, for example, Russia and the EU show approaches for regional data-control. In this regard, Russia has passed a law that requires online personal data to be stored inside its borders and the EU has issued common EU data protection regulations.

This causes a problem if the manufacturers do not want to do local hardware variants, especially for small markets. Also, country specific variants prevent flexible logistics. For example, if one country is having a sudden demand for a specific device, then a container from another country with weaker demand for that device cannot just be reassigned due to different country specific variants for the two countries.

In general the provisioning of software to the eUICC can be based on the following root-security approaches:
  agreeing on one root certificate, but that one would have "full power";
  putting all potential regional root certificates into the eUICC, but that means that all of them have "full power".

ETSI SCP (European Telecommunications Standards Institute Smart Card Platform) outlines the smart card platform architecture. There, the assumption is just the availability of a root of trust. But GSMA members accepted the need of multiple roots for future releases of their work, but do not provide any technical means or approaches how actually to achieve this.

Currently, in document [2], eUICC authentication caching has been proposed, where the authentication is potentially based on the root certificate. Document [3] relates to the management of multiple subscriptions with multiple subscription manager (SM) certificates. Document [4] relates to the Subscriber Identity Module (SIM) provisioning architecture, and document [5] discloses storing new certificates.

However, none of the existing approaches makes it possible to provide country specific control and to allow global production.

REFERENCES

[1]: "Remote Provisioning Architecture for Embedded UICC", GSM Association, Version 1.0, Dec. 17, 2013;
[2]: WO2013/036010 A1
[3]: CN103329582 A
[4]: US2010/062808 A1
[5]: U.S. Pat. No. 8,812,837 B2

SUMMARY OF THE INVENTION

It is therefore an object of the present invention to overcome the above mentioned problems and to provide apparatuses, methods, systems, computer programs, computer program products and computer-readable media regarding handling of certificates for embedded UICCs to allow easy regional control.

According to an aspect of the present invention there is provided a method comprising:
  composing, by a management entity, a deletion command message for deleting certificates from an embedded universal integrated circuit card, eUICC, on which a plurality of certificates is pre-installed,
  the deletion command message including information on certificates to be deleted and an authorization of the management entity, and
  transmitting the deletion command message to the eUICC.

According to another aspect of the present invention there is provided a method comprising:
  receiving, at an embedded universal integrated circuit card, eUICC, on which a plurality of certificates is pre-installed on a storage unit, a deletion command message from a management entity, the deletion command message including an authorization of the management entity and information on certificates to be deleted,
  evaluating, at the eUICC, the authorization included in the deletion command message, and
  if the authorization is validated, deleting, at the eUICC, the certificates based on the information from the storage unit of the eUICC.

According to another aspect of the present invention there is provided an apparatus for use in a management entity, comprising
  at least one processor, and at least one memory for storing instructions to be executed by the processor, wherein the at least one memory and the instructions are configured to, with the at least one processor, cause the apparatus at least to perform composing, by the management entity, a deletion command message for deleting certificates from an embedded universal integrated circuit card, eUICC, on which a plurality of certificates is pre-installed, the deletion command message including information on certificates to be deleted and an authorization of the management entity, and transmitting the deletion command message to the eUICC.

According to another aspect of the present invention there is provided an apparatus for use in an embedded universal integrated circuit card, eUICC, comprising at least one processor, and at least one memory for storing instructions to be executed by the processor, wherein the at least one memory and the instructions are configured to, with the at least one processor, cause the apparatus at least to perform receiving, at the eUICC, on which a plurality of certificates is pre-installed on a storage unit, a deletion command message from a management entity, the deletion command message including an authorization of the management entity and information on certificates to be deleted, evaluating, at the eUICC, the authorization included in the deletion command message, and if the authorization is validated, deleting, at the eUICC, the certificates based on the information from the storage unit of the eUICC.

According to another aspect of the present invention there is provided an apparatus comprising means for composing, by a management entity, a deletion command message for deleting certificates from an embedded universal integrated circuit card, eUICC, on which a plurality of certificates is pre-installed, the deletion command message including information on certificates to be deleted and an authorization of the management entity, and means for transmitting the deletion command message to the eUICC.

According to another aspect of the present invention there is provided an apparatus comprising means for receiving, at the eUICC, on which a plurality of certificates is pre-installed on a storage unit, a deletion command message from a management entity, the deletion command message including an authorization of the management entity and information on certificates to be deleted, means for evaluating, at the eUICC, the authorization included in the deletion command message, and if the authorization is validated, means for deleting, at the eUICC, the certificates based on the information from the storage unit of the eUICC.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become apparent from the following detailed description of aspects/embodiments of the present invention which is to be taken in conjunction with the appended drawings, in which.

DETAILED DESCRIPTION

Figure 1:
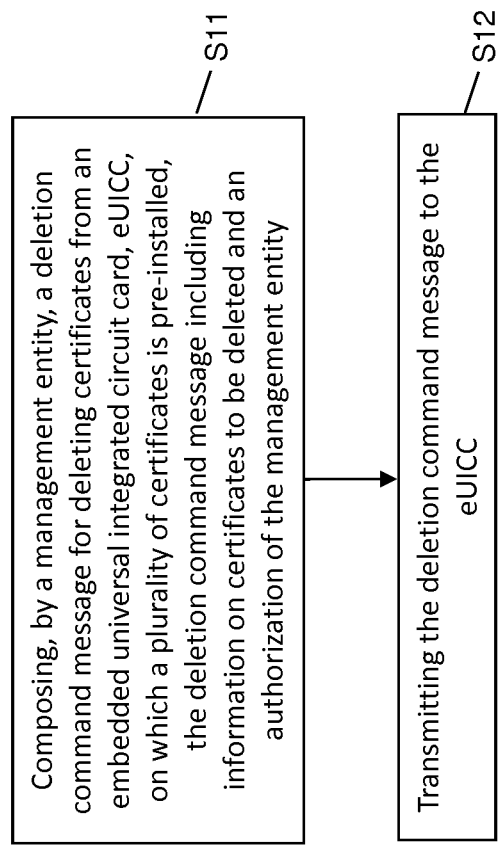
FIG. 1 is a flowchart illustrating an example of a method according to some example versions of the present invention.

In the following, some example versions of the disclosure and embodiments of the present invention are described with reference to the drawings. The following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

Furthermore, the described elements and entities, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

Some example versions of the present invention describe how to securely initialize and regionalize an eUICC. It is an addition to the existing protocols of GSMA and ETSI SCP.

It will provide a country or regional specific control and it will allow global production. As set out above, this is currently not possible with the existing approaches.

According to some example versions of the present invention, the embedded UICC is pre-installed with a range of regional Trust Anchor (TA) certificates, which initially all have the same level or rights. They are stored in a special section, directory or storage unit of the eUICC. The eUICC can be a standalone secure chip or part of the radio module (e.g. from Qualcomm, Samsung). It can be embedded or removable.

Then, the device is sold to a customer in region A. The country or a number of affiliated countries covering region A want to have the sole authority over the devices active in this region.

In this regard, the device is using its provisional subscription to connect to a local operator in the region. The local operator is aware of the region-specific requirements. The Subscription Manager (SM) of that region only uses a local certificate of that region, i.e. the pre-installed regional Trust Anchor of this region.

The key problem is now to get "securely" rid of the implications created by the other TA certificates still retaining their initial level/rights. If those would remain e.g. some country might be able to install some sniffing software for another region.

The entity that manages the eUICC (e.g. SM or SM-SR (Subscription Manager—Secure Routing)) sends a signed (cryptographically authorized) deletion command, while excluding the local region's TA certificate(s) from the deletion list. The particular SM or SM-SR issuing such request might need to be specifically authorized by a Certificate Authority (CA) to do so and such authorization might e.g. be explicitly noted in the SM's or SM-SR's own certificate. That is, it must be confirmed that the deletion command is authorized by one of the root entities on the eUICC. The shortest way to achieve this is that the root entity itself signs the deletion command, i.e. that the deletion command includes the signature of the root entity.

However, it is also applicable that the deletion command contains a signature belonging to another entity and that this entity is authorized by the one of the root entities (either directly or via a certificate chain). For example, the deletion command may contain a signature belonging to a key/certificate of an intermediate entity and the certificate of the intermediate entity is signed by the root entity. Moreover, also cases of multiple intermediate entities being involved in this procedure would be possible, provided with a respective authorization chain.

Thus, according to the present invention as described herein, the term "signed" or "signature" means "(cryptographically) authorized" or "(cryptographical) authorization" and includes the above mentioned cases. That is, the deletion command is cryptographically authorized if it is either signed by the root entity itself or if it is signed by a key/certificate which in turn is signed by the root entity.

The deletion command needs to contain the following information/measures:
- Identity of eUICC/device or chip (e.g. ICCID (Integrated Circuit Card Identifier)), eUICC certificate, i.e. the identity of the recipient of the command;
- Replay protection prevention, e.g. based on counter, Rand or time stamp;
- Command to delete/disable, to distinguish from other potentially possible commands communicated by the same means; and
- Signature (cryptographical authorization) using a key which can be verified by the local root key information stored on the eUICC (this could be public key based or shared key based, but symmetric key based is considered to be unlikely and inefficient, since it does not scale properly). The signature is at least over the Identity, replay protection and command.

Further, the deletion command also includes a list of the certificates to be deleted. However, the deletion command can also be formulated in a negative way, i.e. delete all, except this regional TA certificate.

It is noted that usage of a RAND for replay protection may require up to 4 messages to be exchanged.

In view of the above, it is noted that the term "delete" in this context also includes the option to only "disable"/"take out of active use", without necessarily physically deleting the certificate from the eUICC's storage. It can also mean that it is hidden for a selection function. This would e.g. allow for offline factory reset of the device, but this requires physical access to the eUICC. Further, the term "installation" does not only mean installing the certificate or the like, but also includes the meaning of the terms "enable"/"take into active use" of a certificate that has been disabled or taken out of active use before.

After receiving the deletion command, the eUICC validates the signature (cryptographical authorization) and deletes all other certificates. After that the following might be done:
- Sending a deletion confirmation to the issuer of the deletion command, or another entity. The command is send via SIM OTA (Subscriber Identity Module Over-the-Air) management. It is also possible, depending on eUICC architecture that the command is send using OMA DM (Open Mobile Alliance Device Management (protocol)).
- Burning a fuse, so that further writing to the directory is not allowed, is also one potential way to permanently prevent any additional further TAs certificate, but that would prevent any further future addition or update.

The eUICC enforces the policy that new certificates or subscriptions can only be deleted/installed if the command can be validated to be directly or indirectly authorized by an entity matching to a Trust Anchor certificate installed and enabled at the time a respective command was received. This allows full control by the regional authority.

If the device is later on potentially sold into another region, then a similar approach as above, only with an "enable this certificate" command or "install this new certificate" command signed by the local authority corresponding to the remaining TA certificate enables the device for the new region. Alternatively, a reset to factory settings could be used if part of the initial set of installed Trust Anchor certificates were only disabled, as set out above.

Thus, according to some example versions of the present invention, the eUICC can be securely initialized and regionalized.

In the following, a more general description of example versions of the present invention is made with respect to FIGS. 1 to 3.

FIG. 1 is a flowchart illustrating an example of a method according to example versions of the present invention.

According to example versions of the present invention, the method may be implemented in or may be part of a management entity, like for example, a SM or SM-SR or the like. The method comprises composing, by a management entity, in a step S11 a deletion command message for deleting certificates from an embedded universal integrated circuit card, eUICC, on which a plurality of certificates is pre-installed, the deletion command message including information on certificates to be deleted and an authorization of the management entity, and transmitting the deletion command message to the eUICC in a step S12.

According to example versions of the present invention, the information includes a list of certificates to be deleted.

According to example versions of the present invention, the information indicates that all certificates are to be deleted except for one or more designated certificates.

According to example versions of the present invention, the certificates not to be deleted are certificates belonging to the management entity.

According to example versions of the present invention, the deletion command message further includes an identity of the eUICC, from which the certificates are to be deleted.

According to example versions of the present invention, deleting the certificates also includes disabling the certificates without physically deleting the certificates from the eUICC.

According to example versions of the present invention, installing the certificates includes newly installing the certificates and enabling the certificates, which are pre-installed and have been disabled.

Figure 2:
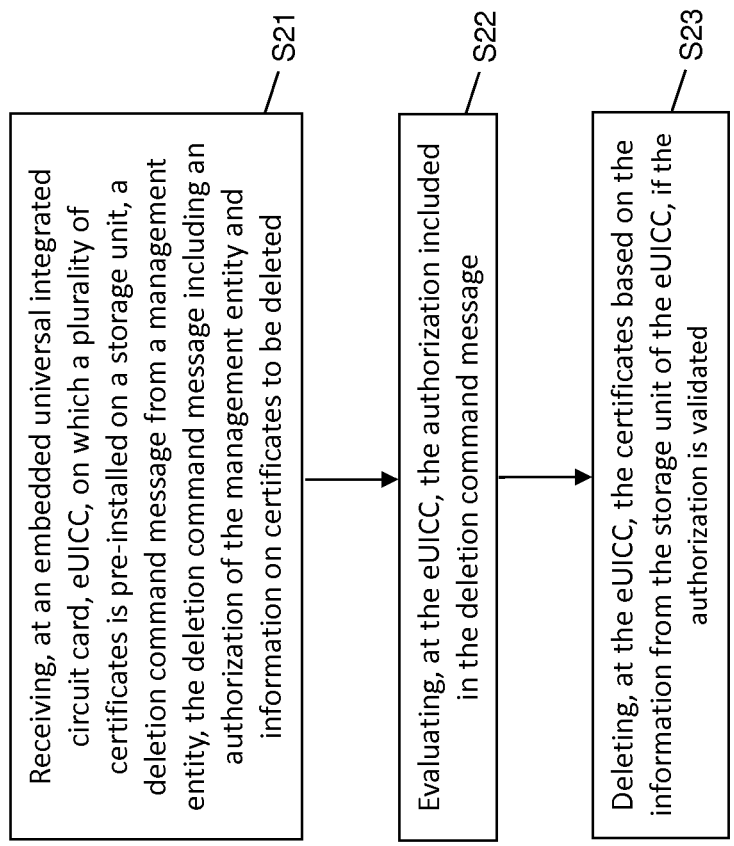
FIG. 2 is a flowchart illustrating another example of method according to some example versions of the present invention.

FIG. 2 is a flowchart illustrating another example of a method according to example versions of the present invention.

According to example versions of the present invention, the method may be implemented in or may be part of a eUICC or a control unit of the eUICC, or the like. The method comprises receiving in a step S21, at an embedded universal integrated circuit card, eUICC, on which a plurality of certificates is pre-installed on a storage unit, a deletion command message from a management entity, the deletion command message including a authorization of the management entity and information on certificates to be deleted, evaluating, at the eUICC, the authorization included in the deletion command message in a step S22, and if the authorization is validated, deleting, at the eUICC, the certificates based on the information from the storage unit of the eUICC in a step S23.

According to example versions of the present invention, the method further comprises transmitting, by the eUICC, a deletion confirmation message to the management entity that has issued the deletion command message.

According to example versions of the present invention, the method further comprises receiving, at the eUICC, a message from the management entity, including the authorization of the management entity and information on certificates to be installed, evaluating, by the control unit, the authorization included in the message, and if the authorization is validated, installing, at the eUICC, the certificates based on the information in the eUICC.

According to example versions of the present invention, the method further comprises receiving, at the eUICC, a message from the management entity, including the authorization of the management entity and an instructions for resetting the eUICC to factory settings, evaluating, by the control unit, the authorization included in the message, and if the authorization is validated, resetting the eUICC to factory settings.

According to example versions of the present invention, the method further comprises disabling any further writing on the storage unit of the eUICC.

According to example versions of the present invention, deleting the certificates also includes disabling the certificates without physically deleting the certificates from the eUICC.

According to example versions of the present invention, installing the certificates includes newly installing the certificates and enabling the certificates, which are pre-installed and have been disabled.

Figure 3:
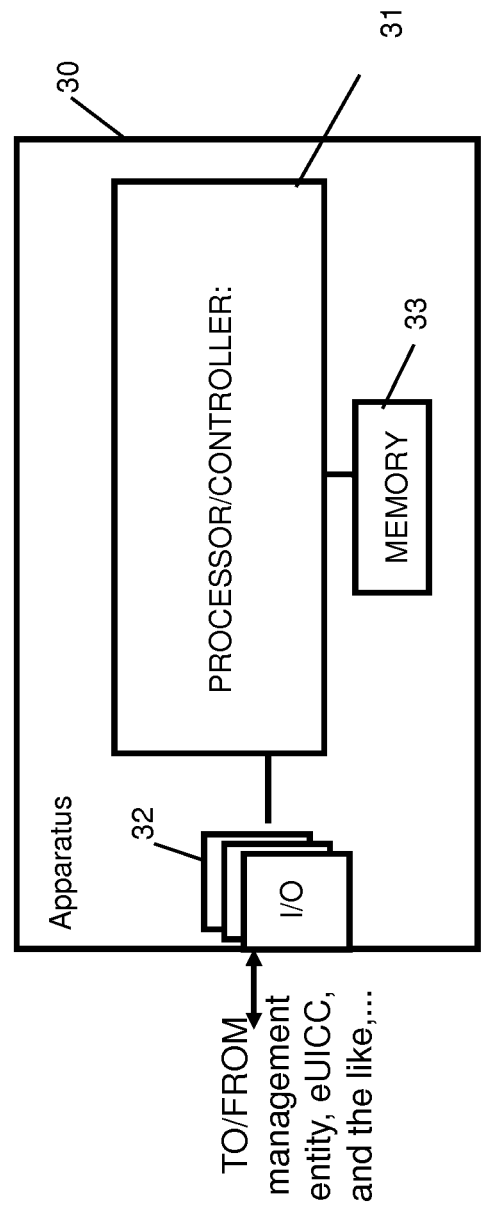
FIG. 3 is a block diagram illustrating an example of an apparatus according to some example versions of the present invention.

FIG. 3 is a block diagram showing an example of an apparatus according to some example versions of the present invention.

In FIG. 3, a block circuit diagram illustrating a configuration of an apparatus 30 is shown, which is configured to implement the above described aspects of the invention. It is to be noted that the apparatus 30 shown in FIG. 3 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 30 may comprise a processing function or processor 31, such as a CPU or the like, which executes instructions given by programs or the like. The processor 31 may comprise one or more processing portions dedicated to specific processing as described below, or the processing may be run in a single processor. Portions for executing such specific processing may be also provided as discrete elements or within one or further processors or processing portions, such as in one physical processor like a CPU or in several physical entities, for example. Reference sign 32 denotes transceiver or input/output (I/O) units (interfaces) connected to the processor 31. The I/O units 32 may be used for communicating with one or more other network elements, entities, terminals or the like. The I/O units 32 may be a combined unit comprising communication equipment towards several network elements, or may comprise a distributed structure with a plurality of different interfaces for different network elements. The apparatus 30 further comprises at least one memory 33 usable, for example, for storing data and programs to be executed by the processor 31 and/or as a working storage of the processor 31.

The processor 31 is configured to execute processing related to the above described aspects. In particular, the apparatus 30 may be implemented in or may be part of a management entity, like for example, a SM or SM-SR or the like, and may be configured to perform a method as described in connection with FIG. 1. Thus, the processor 31 is configured to perform composing, by a management entity, a deletion command message for deleting certificates from an embedded universal integrated circuit card, eUICC, on which a plurality of certificates is pre-installed, the deletion command message including information on certificates to be deleted and an authorization of the management entity, and transmitting the deletion command message to the eUICC.

According to some example versions of the present invention, the apparatus 30 may be implemented in or may be part of an eUICC or a control unit of the eUICC, or the like, and may be configured to perform a method as described in connection with FIG. 2. Thus, the processor 31 is configured to perform receiving, at an embedded universal integrated circuit card, eUICC, on which a plurality of certificates is pre-installed on a storage unit, a deletion command message from a management entity, the deletion command message including an authorization of the management entity and information on certificates to be deleted, evaluating, at the eUICC, the authorization included in the deletion command message, and if the authorization is validated, deleting, at the eUICC, the certificates based on the information from the storage unit of the eUICC.

For further details regarding the functions of the apparatus 30, reference is made to the description of the methods according to some example versions of the present invention as described in connection with FIGS. 1 and 2.

Thus, it is noted that the apparatus for use in a management entity, and the apparatus for use in eUICC or control unit of the eUICC, generally have the same structural components, wherein these components are configured to execute the respective functions of the management entity and the eUICC or control unit of the eUICC, respectively, as set out above.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

The invention claimed is:

1. A method, comprising:
receiving, at an embedded universal integrated circuit card, eUICC, on which a plurality of regional certificates is pre-installed on a storage unit, a deletion command message from a management entity, the deletion command message including an authorization of the management entity and information on regional certificates to be deleted,
evaluating, at the eUICC, the authorization included in the deletion command message, and
if the authorization is validated, deleting, at the eUICC, the regional certificates based on the information from the storage unit of the eUICC.

2. The method according to claim 1, further comprising:
transmitting, by the eUICC, a deletion confirmation message to the management entity that has issued the deletion command message.

3. The method according to claim 1, further comprising:
receiving, at the eUICC, a message from the management entity, including the authorization of the management entity and information on certificates to be installed,
evaluating, by the control unit, the authorization included in the message, and
if the authorization is validated, installing, at the eUICC, the certificates based on the information in the eUICC.

4. A computer program product embodied on a non-transitory computer-readable medium, said product including a program for a processing device, comprising software code portions for performing the method of claim 1 when the program is run on the processing device.

5. An apparatus for use in an embedded universal integrated circuit card, eUICC, comprising:
at least one processor; and
at least one memory for storing instructions to be executed by the processor; wherein
the at least one memory and the instructions are configured to, with the at least one processor, cause the apparatus at least to perform
receiving, at the eUICC, on which a plurality of regional certificates is pre-installed on a storage unit, a deletion command message from a management entity, the deletion command message including an authorization of the management entity and information on regional certificates to be deleted,
evaluating, at the eUICC, the authorization included in the deletion command message, and
if the authorization is validated, deleting, at the eUICC, the regional certificates based on the information from the storage unit of the eUICC.

6. The apparatus according to claim 5, further comprising:
transmitting, by the eUICC, a deletion confirmation message to the management entity that has issued the deletion command message.

7. The apparatus according to claim 5, further comprising:
disabling any further writing on the storage unit of the eUICC.

8. The apparatus according to claim 5, wherein
deleting the certificates also includes disabling the certificates without physically deleting the certificates from the eUICC.

9. The apparatus according to claim 5, wherein
installing the certificates includes newly installing the certificates and enabling the certificates, which are pre-installed and have been disabled.

10. An apparatus for use in an embedded universal integrated circuit card, eUICC, comprising:
at least one processor; and
at least one memory for storing instructions to be executed by the processor; wherein
the at least one memory and the instructions are configured to, with the at least one processor, cause the apparatus at least to perform
receiving, at the eUICC, on which a plurality of certificates is pre-installed on a storage unit, a deletion command message from a management entity, the deletion command message including an authorization of the management entity and information on certificates to be deleted,
evaluating, at the eUICC, the authorization included in the deletion command message,
if the authorization is validated, deleting, at the eUICC, the certificates based on the information from the storage unit of the eUICC,
receiving, at the eUICC, a message from the management entity, including the authorization of the management entity and an instructions for resetting the eUICC to factory settings,
evaluating, by the control unit, the authorization included in the message, and
if the authorization is validated, resetting the eUICC to factory settings.

* * * * *